O. W. FISHER.
TOPPING MECHANISM FOR VEGETABLE HARVESTERS.
APPLICATION FILED SEPT. 22, 1911.
1,082,625. Patented Dec. 30, 1913.
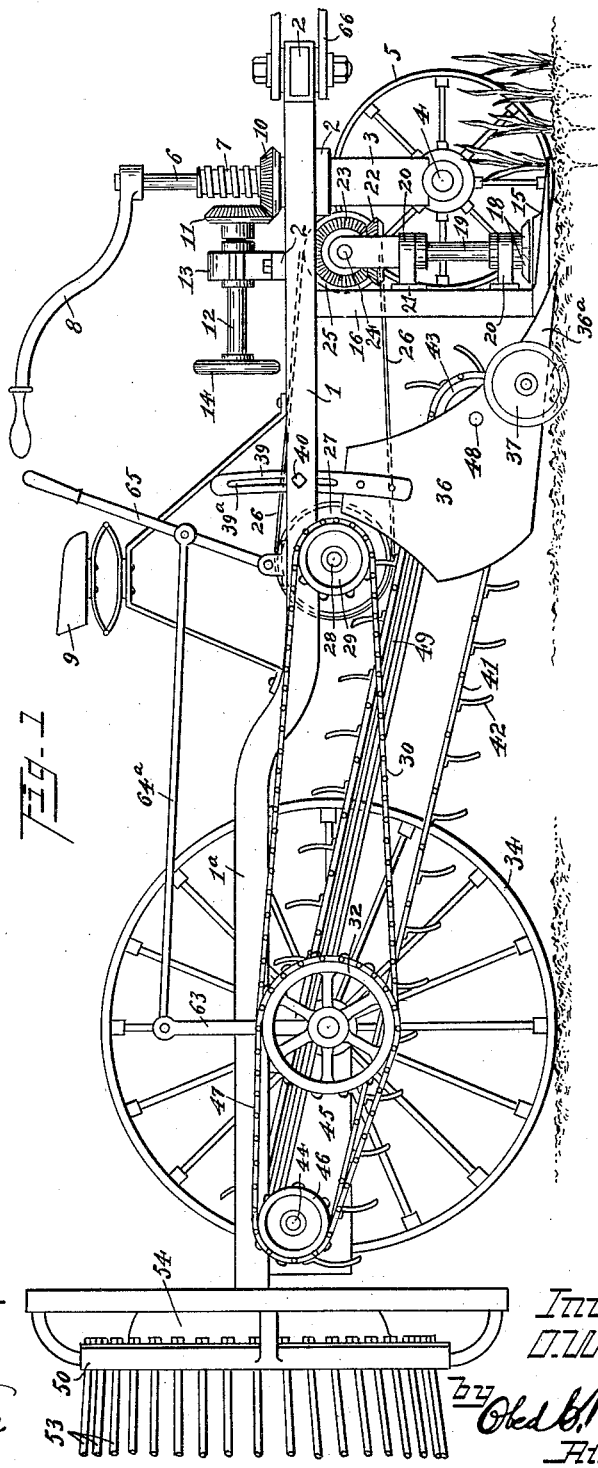

O. W. FISHER.
TOPPING MECHANISM FOR VEGETABLE HARVESTERS.
APPLICATION FILED SEPT. 22, 1911.
1,082,625.
Patented Dec. 30, 1913.
2 SHEETS—SHEET 2.
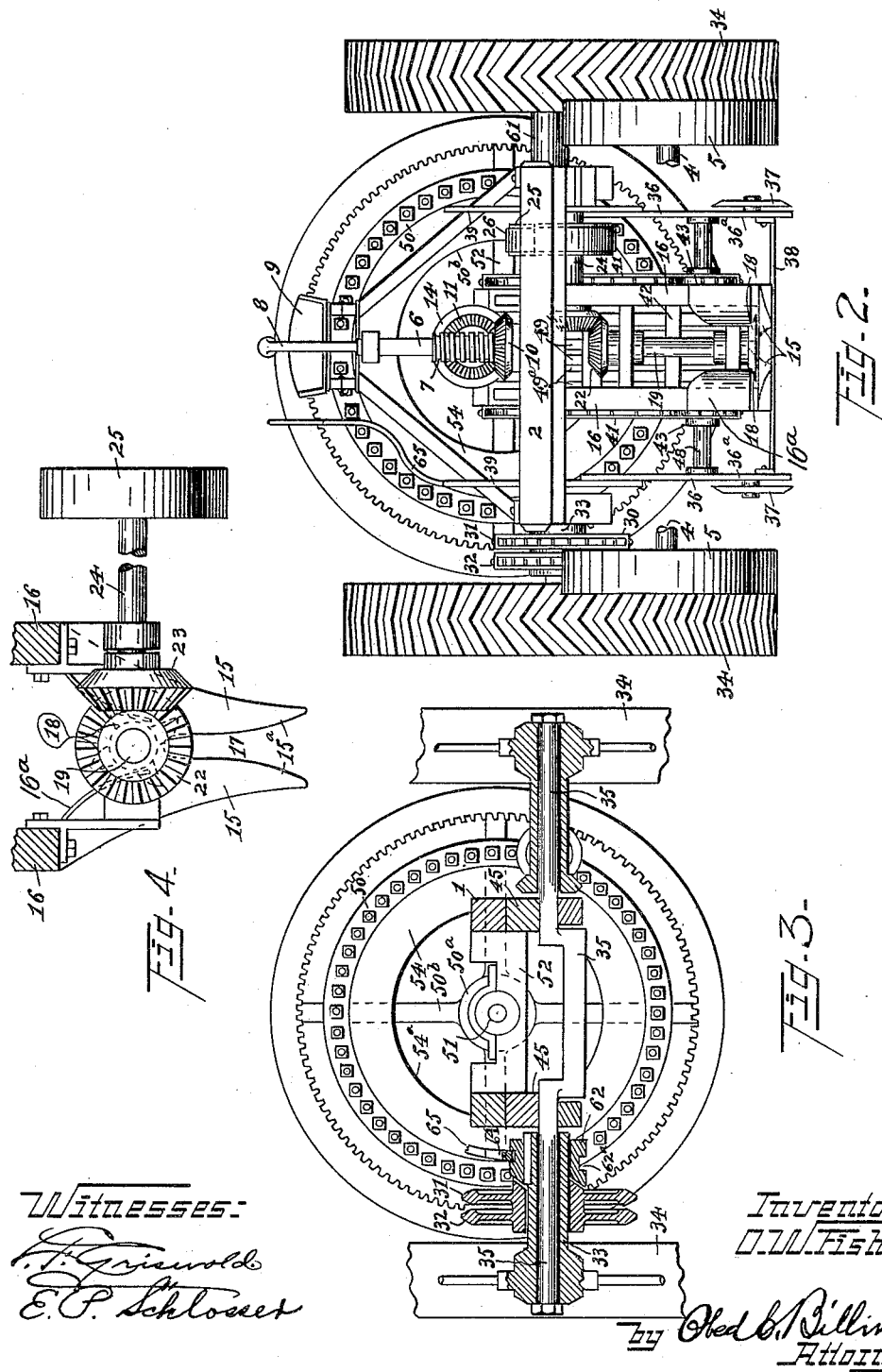
Witnesses:
Inventor
O.W. Fisher

UNITED STATES PATENT OFFICE.

OLIVER W. FISHER, OF PAINESVILLE, OHIO.

TOPPING MECHANISM FOR VEGETABLE-HARVESTERS.

1,082,625.   Specification of Letters Patent.   Patented Dec. 30, 1913.

Application filed September 22, 1911. Serial No. 650,701.

*To all whom it may concern:*

Be it known that I, OLIVER W. FISHER, a citizen of the United States, residing at Painesville, in the county of Lake and State of Ohio, have invented certain new and useful Improvements in Topping Mechanism for Vegetable-Harvesters, of which the following is a specification.

My invention relates to improvements in topping mechanism for vegetable harvesters, and more particularly to that class or type which are designed to cut or sever the tops from the vegetables while in the ground and in advance of the digging and conveying or elevating mechanism, the latter mechanism being adapted to remove the topped vegetables from the ground and elevate, clean, sort, and discharge the same into a suitable receptacle, or, if desired, upon the ground at the rear of the machine.

The present invention relates to topping mechanism for vegetable harvesters and in the present instance is shown in connection with an onion harvesting machine, but it is apparent that the same may be readily adapted for topping other vegetables such as sugar beets, and the like.

The primary object of the invention is to provide improved topping mechanism of this class of exceedingly simple, cheap and efficient construction, having its parts so arranged and adjusted that the same may be readily adapted to meet the varying exigencies of actual service.

With the above mentioned and other ends in view, the invention consists in the novel construction, arrangement and combination of parts, hereinafter described, illustrated in one of its embodiments in the accompanying drawings, and particularly pointed out in the appended claims.

Referring to the drawings forming a part of this specification, Figure 1, is a side elevation of a harvester in its normal or operative position, and illustrating the manner in which the topping mechanism cuts or severs the tops from the vegetables in advance of the digger and conveyer mechanism. Fig. 2, a front elevation of the same. Fig. 3, a sectional view of the gearing mounted on the rear axle for driving the topping, conveyer, and sorter mechanism. Fig. 4, a top plan view of the topping mechanism detached from the main frame.

Similar numerals of reference designate like parts throughout all the figures of the drawings.

The improved harvester comprises a frame consisting, in the present instance, of side beams or members 1, connected by suitable cross bars 2, said side beams being preferably curved upwardly and rearwardly intermediate their ends to form a reduced rear frame portion 1$^a$.

As a means for guiding the machine as well as providing means for elevating or lowering the front end of the frame together with the vegetable topping, digging and conveying mechanism, carried by the latter, as hereinafter described, the front of the frame is provided with an axle beam 3, carrying an axle shaft 4, the latter being provided with front or guide wheels 5. The axle beam 3 and shaft 4, are pivoted beneath the front cross bar 2, through the medium of a king bolt or guide shaft 6, extending upwardly through an externally threaded bearing sleeve 7, the upper end of the bolt or shaft 6, being provided with a guide lever 8, extending rearwardly within convenient reach of the operator seated in the seat 9, supported on the main frame or side beams 1. The threaded bearing sleeve 7, is surrounded by an internally threaded bevel gear 10 secured to the cross bar 2, and adapted to be operated by a second bevel gear 11, carried upon the end of a shaft or column 12, the latter being mounted in a suitable bearing 13, carried upon one of the cross bars 2. The shaft or column 12, is provided with a wheel 14, within convenient reach of the operator, whereby the front portion of the machine frame may be elevated or depressed in an obvious manner as occasion may demand.

The machine is adapted to straddle the row of vegetables to be topped and harvested, as illustrated in Fig. 1, of the drawings, and as a means for topping the vegetables in the ground in advance of the digger and conveyer, the front end of the frame is provided with guide members 15, carried upon depending supporting arms 16, said guide members being spaced apart to provide an intermediate vegetable top receiving recess 17, the front ends of the guide members being diverging as at 15$^a$, to more effectually guide the tops to the cutting device at the rear and just above the guide members 15, as now described.

The depending arms 16, are provided with forwardly extending curved guard members 16ª, extending just above the cutters or blades 18, of the top cutting or severing device hereinafter described, said guard members serving to keep the cut tops from the cutting device and to distribute the same at opposite sides of the guide members 15, as shown most clearly in Figs. 2 and 4, of the drawings.

The improved vegetable top cutting or severing device forming the subject-matter of the appended claims comprises, in combination with the parts just described, a plurality of cutters or blades 18, having a shear cutting contact with one of the guide members 15, said cutters being mounted upon the lower end of a vertically arranged driving shaft 19, mounted in suitable bearings 20, the latter being carried upon cross bars 21, between the supporting arms 16. The driving shaft 19, is provided at its top with a bevel gear 22, meshing with a second bevel gear 23, carried upon a driving shaft 24, mounted in suitable bearings carried by the frame of the machine, said driving shaft being provided with a pulley 25, driven by a belting 26 (or sprocket chain) the latter passing over a second pulley 27, carried upon one end of a driving shaft 28, the latter being provided at its opposite end with a sprocket wheel 29. The sprocket wheel 29, is driven by a sprocket chain 30, passing over a second sprocket wheel 31, the latter, together with a companion sprocket wheel 32, being loosely mounted upon a wheel sleeve 33, forming a part of one of the wheels 34, said traction wheels 34, being mounted, in the present instance, on an axle shaft 35, extending beneath the rear frame portion 1ª, of the machine.

As a means for digging and conveying the topped vegetables from the ground after they are operated upon by the cutting device above described, a digger plow is provided, said digger plow being adjustably mounted beneath the front portion of the machine frame a short distance behind the topping device, and comprising, in the present instance, side plates or members 36, having forwardly extending pointed portions 36ª, said side members being provided with revoluble cutter disks 37, adapted to extend into the soil at the sides of the rows, and as a means for cutting or loosening the soil beneath the vegetables in the act of digging and conveying the topped vegetables to the conveyer, hereinafter described, said side members are provided with a transversely extending cutter blade 38, of any suitable shape and form desired. The side members 36, are adjustably carried on the side beams 1, of the frame by means of supporting straps or members 39, provided with guide slots 39ª, the latter extending over adjusting bolts 40, secured in the side beams 1, of the machine frame.

As a means for conveying and elevating the topped vegetables, loosened earth, etc., as the latter are received from the digger, a conveyer is provided, said conveyer comprising a pair of endless sprocket chains 41, provided at suitable intervals with transversely extending carrier blades or members 42, said sprocket chains passing over sprocket wheels 43, and as a means for driving said conveyer the sprocket wheels 43, at the upper rear portion of the conveyer are mounted on a driving shaft 44, mounted in suitable bearings or bearing blocks 45, secured beneath the rear portion of the side beams 1, said driving shaft being provided with a sprocket wheel 46, adapted to receive motion from the sprocket wheel 32, of the wheel sleeve 33, through the medium of a sprocket chain 47. The lower sprocket wheels 43, are mounted on a transverse shaft 48, extending between the side plates or members 36, of the digger, whereby the lower end of the conveyer is carried in proper relative position to the digger parts, and is adapted to be simultaneously lowered or elevated with the latter through the medium of the supporting straps 39, and adjusting bolts 40, and whereby the depth of the digger may be regulated in accordance with the size or character of the vegetables to be harvested. The carrier blades or members 42, are adapted to pass over a plurality of longitudinally arranged slats or boards 49, whereby the topped vegetables, soil, etc., are carried and elevated, and if desired, the slats or boards may be spaced apart to provide longitudinally extending slots 49ª, through which loose dirt, small vegetables, etc., may fall, the larger vegetables being discharged at the upper rear end of the machine into a revoluble sorter to be now described.

The revoluble sorter is arranged at the rear end of the machine and comprises a pair of spider heads or rim members 50, having their hub members 50ª, mounted on a bearing shaft or bar 51, extending horizontally from the rear end of the machine, said bearing shaft 51, being supported, in the present instance, from the cross bar 52, at the rear end of the machine frame. The spider heads 50, are provided with a plurality of rearwardly flaring and diverging sorter bars 53, and as a convenient means for receiving the topped vegetables from the upper end of the conveyer, the upper spider head is provided with a feed neck 54, having a reduced feed opening 54ª, through which the topped vegetables are discharged from the upper end of the conveyer.

As a means for throwing the companion sprocket wheels 31 and 32, together with the topping and conveying mechanism connected therewith, into and out of gear or connection with the wheel sleeve 33, and adjacent traction wheel 34, a clutch 62, is slidably mounted on the wheel sleeve 33, said clutch being provided with suitable clutch teeth adapted to engage and coöperate with clutch teeth in the hub portion of the sprocket wheels 31 and 32, said clutch being adapted to be moved by means of a shifting lever 63, provided with a collar 64, adapted to operate in the inclined groove 62$^a$, of the clutch member, the shift lever 63, being provided at its upper or free end with a connecting rod 64$^a$, connected to an operating hand lever 65, within convenient reach of the operator seated in the seat 9, of the machine, whereby the operator may readily throw the topping and conveying mechanism into and out of gear, as desired.

The various sizes of topped vegetables passing from the revoluble sorter at the rear of the machine may be discharged into a suitable receptacle carried at the rear of the machine, or, if desired, may be discharged upon the ground.

The wheel sleeves or hubs 33, and 61, and traction wheels 34, may be driven through any suitable and convenient source of power such as a motor or engine carried upon the machine frame and suitably connected, or if desired, may be drawn by horses hitched to the front of the machine through a clevis member 66, connected to the front cross bar 2, in any suitable and convenient manner.

As the digger conveyer and sorter mechanism above described form no part of the present invention as herein claimed, the same need not be further illustrated, or further described in detail.

From the foregoing description, taken in connection with the accompanying drawings, the operation and advantages of my invention will be readily understood.

Having thus described an embodiment of my invention, what I claimed and desire to secure by Letters Patent is,—

1. In a vegetable harvester, a pair of guide members provided with a vegetable top receiving recess, a vertical driving shaft provided with a plurality of horizontally arranged cutters extending across said top receiving recess and adapted to coöperate with one of said guide members, guard members above said cutters, and means for operating said driving shaft and cutters.

2. In a vegetable harvester, a frame provided at its front with guide members forming an intermediate vegetable top receiving recess, a vertical shaft provided with vegetable cutters at the rear of said vegetable top receiving recess and having a shear cutting contact with one of said guide members, curved guard members above and extending to the rear of said cutters, and means for operating said vertical shaft.

3. In a vegetable harvester, a frame provided at its front with depending supporting arms, cross bars extending between the latter, a vertical driving shaft mounted on said cross bars, forwardly extending curved vegetable guide members carried by said depending supporting arms and spaced apart to form an intermediate rearwardly converging top receiving recess, a plurality of horizontally extending cutter blades mounted on said driving shaft at the rear of said recess, and traction wheel actuated gearing carried by said frame for operating said driving shaft.

4. In a vegetable harvester, a frame provided with depending supporting arms, horizontally extending vegetable guide members carried upon the lower ends of said arms and extending forwardly and spaced apart forming an intermediate vegetable top receiving recess, cross bars carried by said depending supporting arms, a vertical driving shaft mounted on said cross bars, horizontally extending cutters carried by said driving shaft at the rear of said vegetable top receiving recess, and curved guard members carried by said depending supporting arms and extending above said horizontally extending cutters.

In testimony whereof I have affixed my signature in presence of two witnesses.

OLIVER W. FISHER.

Witnesses:
 GEO. J. VON BESELER,
 F. D. HAHN.

---

Copies of this patent may be obtained for five cents each, by addressing the "Commissioner of Patents, Washington, D. C."